(No Model.)
O. SUNDGREN.
WINNOWING WHEEL FOR SEPARATING GRANULAR SUBSTANCES.
No. 478,828. Patented July 12, 1892.
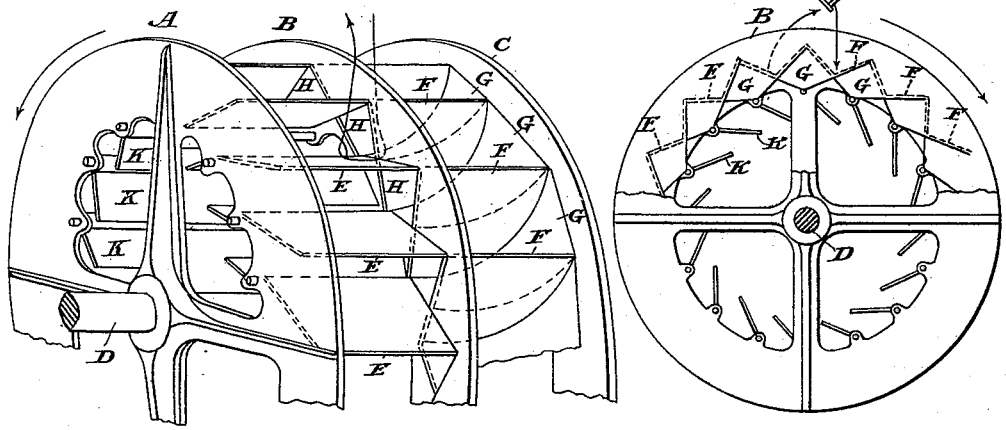
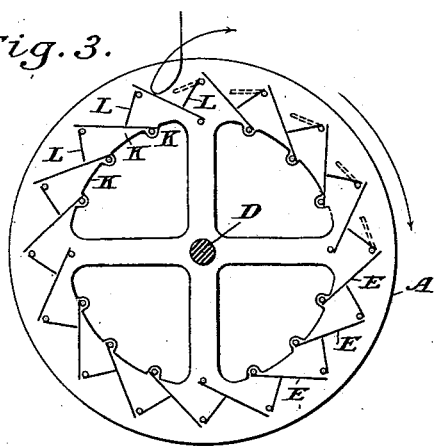
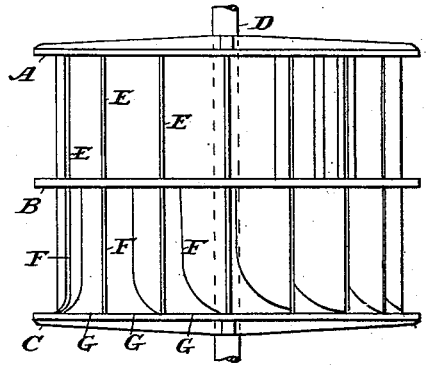
WITNESSES:
INVENTOR
Olof Sundgren
BY
ATTORNEYS

UNITED STATES PATENT OFFICE.

OLOF SUNDGREN, OF ÖSTERSUND, SWEDEN.

WINNOWING-WHEEL FOR SEPARATING GRANULAR SUBSTANCES.

SPECIFICATION forming part of Letters Patent No. 478,828, dated July 12, 1892.

Application filed February 20, 1892. Serial No. 422,330. (No model.) Patented in Sweden May 28, 1891, No. 3,251.

*To all whom it may concern:*

Be it known that I, OLOF SUNDGREN, land-surveyor, of Östersund, Sweden, a subject of the King of Sweden and Norway, have invented certain new and useful Improvements in Winnowing-Wheels for Separating Granular Substances, (patented in Sweden May 28, 1891, No. 3,251,) of which I declare the following to be a full, clear, and exact description.

This invention relates to a construction having for its purpose to separate granular substances—for instance, corn and such like—into several different grades, the construction consisting of a wheel revolving on a horizontal shaft and provided with shovels, which, during the rotary motion of the wheel, catch and throw out the particles fed down to the same. It is evident that the particles when being thrown out will fall down at different distances from the winnowing-wheel, depending upon the differences in their weight, and thus they may be gathered in grades of different weight into vessels placed successively one behind another in the throwing direction counted from the wheel. The winnowing-wheel is further so constructed that the particles do not receive any deleterious concussion when falling down upon the same, and, further, so that the amplitude of the throw may be regulated with greatest possible exactitude.

In the annexed drawings, Figure 1 represents the wheel in perspective. Fig. 2 is an end view of the same with the one wheel-ring partially removed. Fig. 3 is a modification, and Fig. 4 is a top view at the wheel shown in Figs. 1 and 2.

The wheel consists of three rings A B C placed at a short distance one from another and by means of arms supported by the horizontal shaft D.

Between the rings A and B are shovels fixed not radially, but in a suitable inclination to the radius and parallel with the shaft D. These shovels have for their object to throw out the substance which it is desired to sort. It is evident that the shovels during the rotary motion of the wheel must advance with the ends directed toward the shaft D—that is to say, the direction indicated by the arrows on the drawings. If the wheel were to be used such as described above—that is, if the substance to be sorted were to be fed down directly upon the shovels E during the rotation of the wheel—then the concussion between the shovels and the particles would, owing to the comparatively great speed of rotation of the wheel and owing to the speed of the falling particles, be so great that the latter ones might easily be crushed. Therefore the substance to be sorted is not fed down directly upon the shovels E or between the rings A and B, but between the rings B and C. Between these rings there are also shovels, which are all inclined in the direction at right angles with relation to the shovels E and of which each corresponds to a shovel E and fixed so with relation to them that the inner edges of both shovels are lying in the same line.

Between the shovels F there are fixed, as shown on the drawings, curved guides G, the inner edges of which are lying in a line with and resting against the side edges of the shovels E directed toward them, whereby the latter form, as it were, a continuation from the former through every opening H in the ring B. As shown in Fig. 1, these latter openings are limited at two opposite sides by the edges of two shovels E and at the two other opposite ones by the edges of two shovels F. If thus a particle, in the manner shown, Fig. 2, is fed down upon a shovel F from a feeding-funnel I while the wheel is rotating in the direction indicated by the arrow, it does not produce any concussion, but is slid down along the last-mentioned shovel toward its lower edge until it encounters the guide G, by which it is transferred in upon the shovel E, which, owing to its above position, throws off the particle in a given direction. It is evident that in every compartment formed by two shovels F and a guide G there will arise a strong air-current while the wheel is rotating, depending upon the position of the shovels F. This air-current contributes particularly to transfer the matter fed down upon the shovels F upon the shovels E. In order to produce an adjustable air-current even between these latter shovels, there are at their inner edges, as shown by the drawings, lids K, turning on pivots running in the rings A and B. (See Fig. 1.) These lids can either, as shown, Fig. 3, close the openings between the inner edges of the shovels E altogether, or, as shown in Figs. 1 and 2, be opened so as to catch during the rotation of the wheel a quantity of air, which then can pass over every shovel E, and thus aid in throwing out the matter to be sorted and in depriving it of dust and impurities.

In Fig. 3 a modification of the invention is represented. The wheel consists of two rings, between which there are fixed shovel E and pivoted lids K. The object of this wheel is to feed down the substance to be sorted directly upon the shovels E; but in order to mitigate in some degree the concussion arising hereby there are doors L pivoted on the outer edges of the shovels, which doors may be turned so as to vary the angle between the door and the subsequent shovel, whereby a particle fed down upon a door may be caused to glide more or less centrally toward the shovel. It is evident that not all particles can hit the doors, but in lieu the preceding shovels, whereby the particles will evidently experience concussions; but if the feeding takes place at the right place of the circumference of the wheel—that is to say, the particles fall as little centrally as possible against the shovels—the sorting can take place without damaging the material.

What I claim is—

1. In a separator, the combination, with the rings A B C, of a series of buckets disposed between rings A B and B C, a series of shovels, and communicating means between the buckets and shovels, substantially as set forth.

2. In a separator, the combination, with shaft D, rings A B C, of a series of buckets disposed between said rings, the buckets G, having curved guide-walls, shovels disposed at an inclination to the radius and parallel with shaft D, and openings H in ring B, whereby the material may pass from said buckets to said shovels, substantially as set forth.

3. In a separator, the combination, with the shaft D, of rings A B C, buckets having curved guide-walls, shovels E, openings H between said buckets and shovels E, and pivoted lids K, adjacent to said shovels E, substantially as set forth.

In witness whereof I have hereunto signed my name in the presence of two subscribing witnesses.

OLOF SUNDGREN.

Witnesses:
C. W. ERDMAN,
ERNST SVANQVIST.